United States Patent
McCullagh

(10) Patent No.: US 9,166,636 B2
(45) Date of Patent: Oct. 20, 2015

(54) REJECTION OF RF INTERFERERS AND NOISE IN A WIRELESS COMMUNICATIONS TRANSCEIVER

(75) Inventor: Mici McCullagh, Lisburn (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 407 days.

(21) Appl. No.: 13/594,449

(22) Filed: Aug. 24, 2012

(65) Prior Publication Data

US 2012/0322395 A1 Dec. 20, 2012

Related U.S. Application Data

(63) Continuation of application No. PCT/EP2011/052768, filed on Feb. 24, 2011.

(30) Foreign Application Priority Data

Feb. 24, 2010 (GB) .................................. 1003183.9

(51) Int. Cl.
*H04B 1/02* (2006.01)
*H04B 1/10* (2006.01)
*H04B 1/525* (2015.01)

(52) U.S. Cl.
CPC .............. *H04B 1/1036* (2013.01); *H04B 1/525* (2013.01)

(58) Field of Classification Search
CPC .... H04B 1/525; H04B 1/1036; H04B 1/0475; H04B 2001/0408
USPC .......... 455/91, 114.1, 114.2, 115.1, 120, 125, 455/127.1, 63.1, 296
See application file for complete search history.

(56) References Cited

U.S. PATENT DOCUMENTS

| | | | |
|---|---|---|---|
| 5,930,688 A | 7/1999 | Floyd et al. | |
| 6,212,367 B1 | 4/2001 | Tolson | |
| 7,221,924 B2 | 5/2007 | Zheng et al. | |
| 7,266,360 B2 | 9/2007 | Kang et al. | |
| 7,436,908 B2 * | 10/2008 | You et al. | 375/340 |
| 7,471,204 B2 | 12/2008 | Safarian et al. | |
| 7,999,608 B1 * | 8/2011 | Groe et al. | 327/556 |
| 2005/0107051 A1 | 5/2005 | Aparin et al. | |

(Continued)

FOREIGN PATENT DOCUMENTS

| | | |
|---|---|---|
| CN | 1230089 A | 9/1999 |
| EP | 0813310 A1 | 12/1997 |

(Continued)

OTHER PUBLICATIONS

Groe, John, "A Multimode Cellular Radio," IEEE Transactions on Circuits and Systems—II: Express Briefs, Mar. 2008, vol. 55, No. 3, IEEE, Washington, DC.

(Continued)

*Primary Examiner* — Tuan Pham
(74) *Attorney, Agent, or Firm* — Leydig, Voit & Mayer, Ltd.

(57) ABSTRACT

The invention provides a radio receiver or transceiver having one or more low noise amplifiers corresponding to one or more antenna inputs wherein one or more outputs of the one or more low noise amplifiers is/are combined at a single output current summing node, a tunable, shunt notch filter is coupled or connected to the summed output node that allows for the attenuation of a Tx blocker or interferer, an external blocker or interferer or an internal on-chip interferer.

21 Claims, 7 Drawing Sheets

*Multi-band transceiver strip with active notch filter*

(56) References Cited

U.S. PATENT DOCUMENTS

| | | |
|---|---|---|
| 2005/0227652 A1 | 10/2005 | Kang et al. |
| 2006/0030277 A1 | 2/2006 | Cyr et al. |
| 2006/0154638 A1 | 7/2006 | Zheng et al. |
| 2007/0105521 A1 | 5/2007 | Granata |
| 2007/0264943 A1 | 11/2007 | Darabi |
| 2008/0009257 A1 | 1/2008 | Safarian |
| 2008/0107093 A1* | 5/2008 | Meiyappan et al. .......... 370/339 |
| 2008/0242245 A1 | 10/2008 | Aparin |
| 2009/0213764 A1 | 8/2009 | Chiu et al. |
| 2009/0213770 A1 | 8/2009 | Mu |
| 2009/0233568 A1 | 9/2009 | Zhang et al. |

FOREIGN PATENT DOCUMENTS

| | | |
|---|---|---|
| EP | 1780888 A1 | 5/2007 |
| GB | 2317760 A | 4/1998 |
| WO | 9320621 A1 | 10/1993 |

OTHER PUBLICATIONS

Vallese et al., "Analysis and Design of an Integrated Notch Filter for Rejection of Interface in UWB Systems," IEEE Journal of Solid-State Circuits, Feb. 2009, vol. 44, No. 2, IEEE, Washington, DC.

Tenbroek et al., "Single-Chip Tri-Band WCDMA/HSDPA Transceiver Without External SAW Filters and with Integrated TX Power Control," IEEE International Solid-State Circuits Conference, Feb. 5, 2008, IEEE, Washington, DC.

International Search Report in corresponding International Patent Application No. PCT/EP2011/052768 (Jun. 30, 2011).

Written Opinion of the International Searching Authority in corresponding International Patent Application No. PCT/EP2011/052768 (Jun. 30, 2011).

* cited by examiner

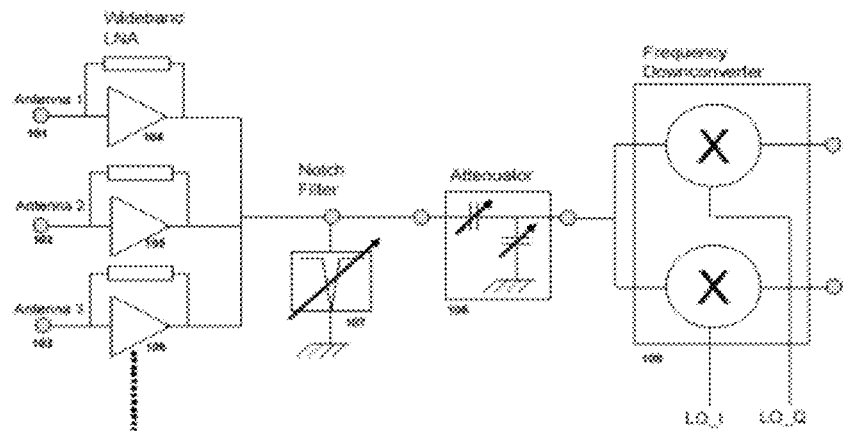
Figure 1: Multi-band receiver strip with active notch filter
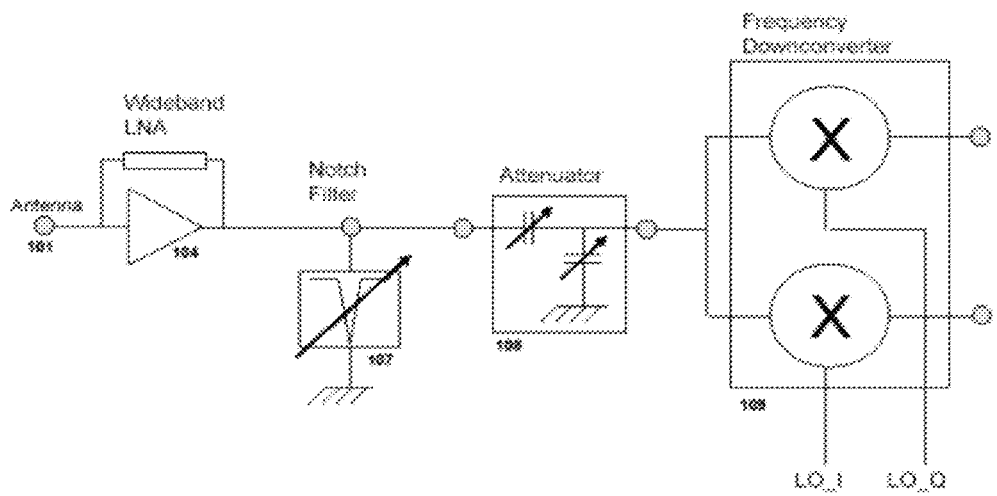
Figure 2: Single band receiver strip with active notch filter

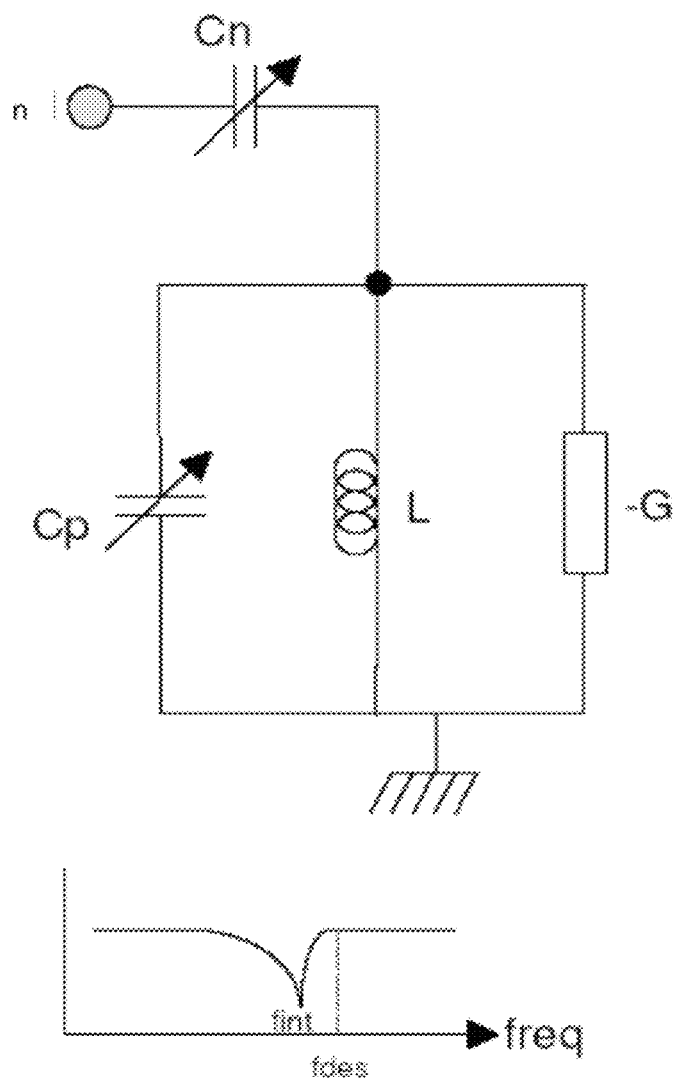
*Figure 3: Single ended notch filter, single interferer case*

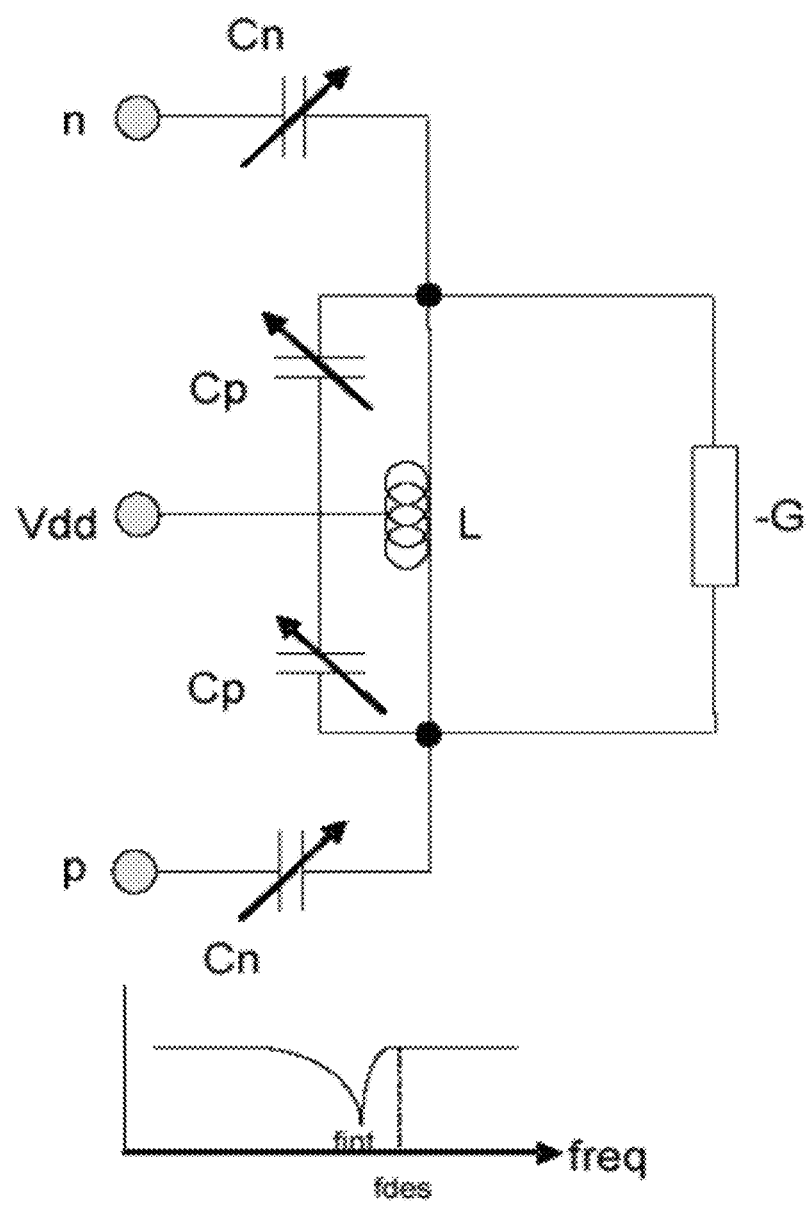
*Figure 4: Differential notch filter, single interferer case*

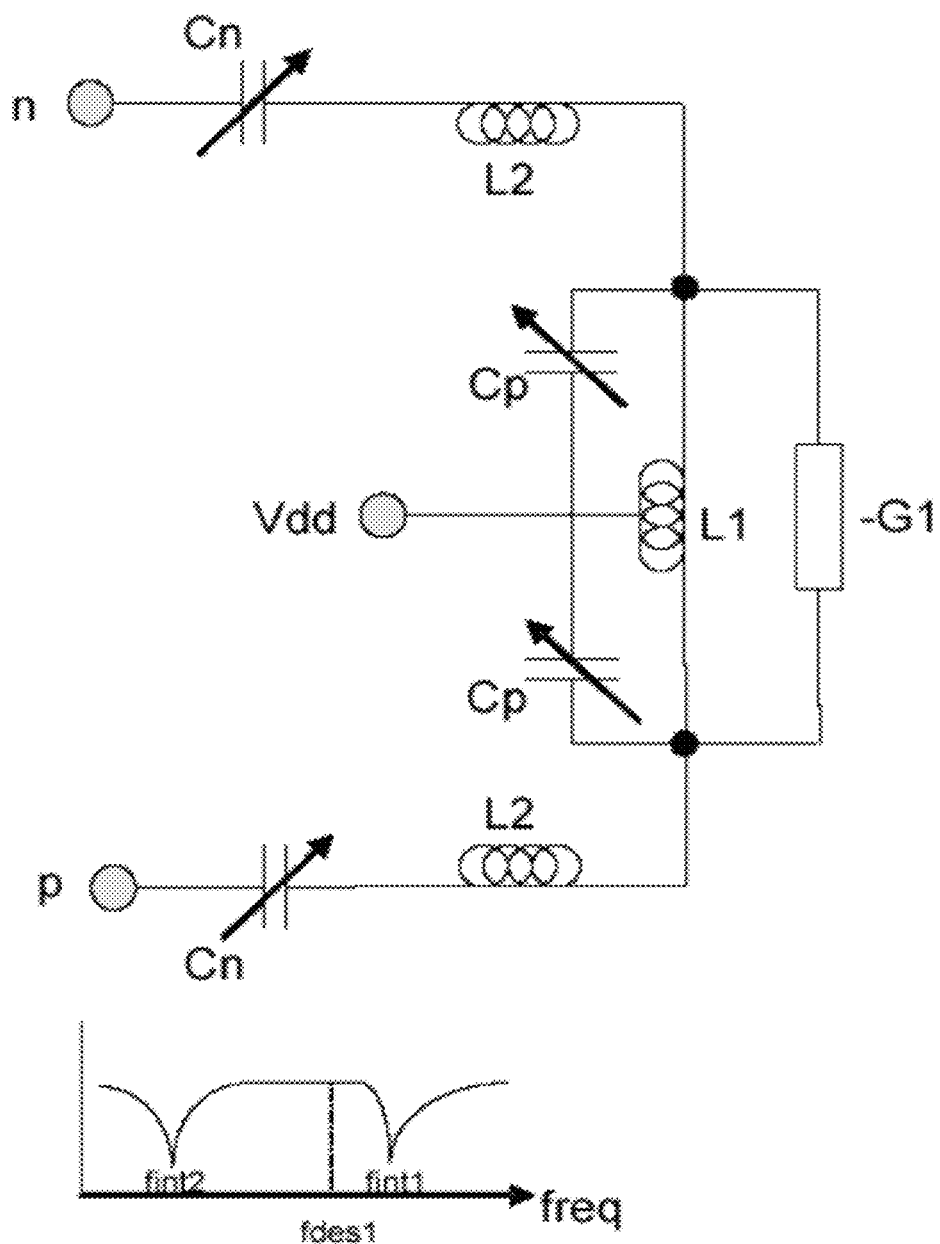
*Figure 5: Differential notch filter, dual interferer*

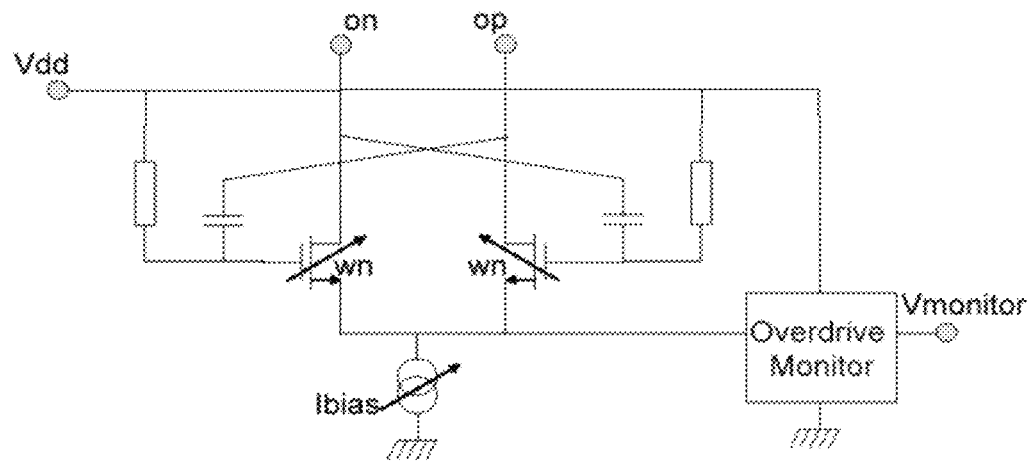
*Figure 6: Negative Conductance Cell*
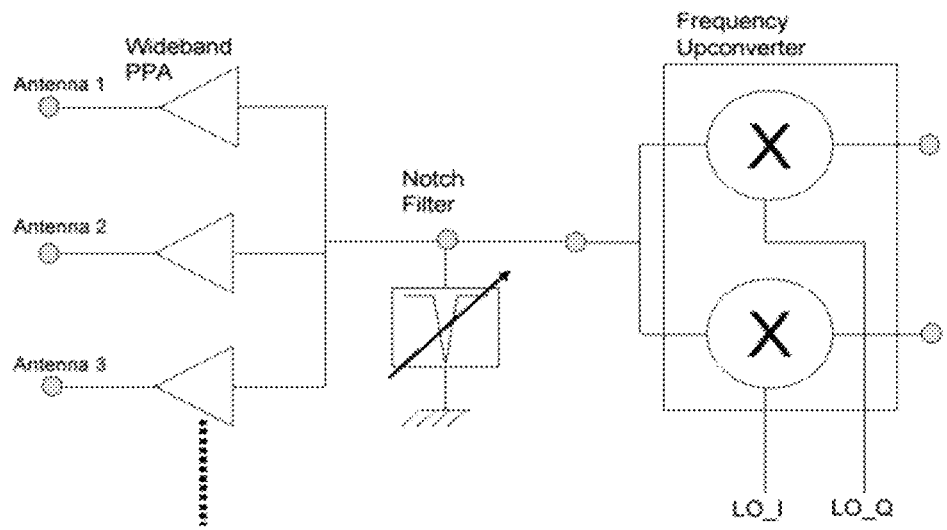
*Figure 8: Multi-band transmitter strip with active notch filter*

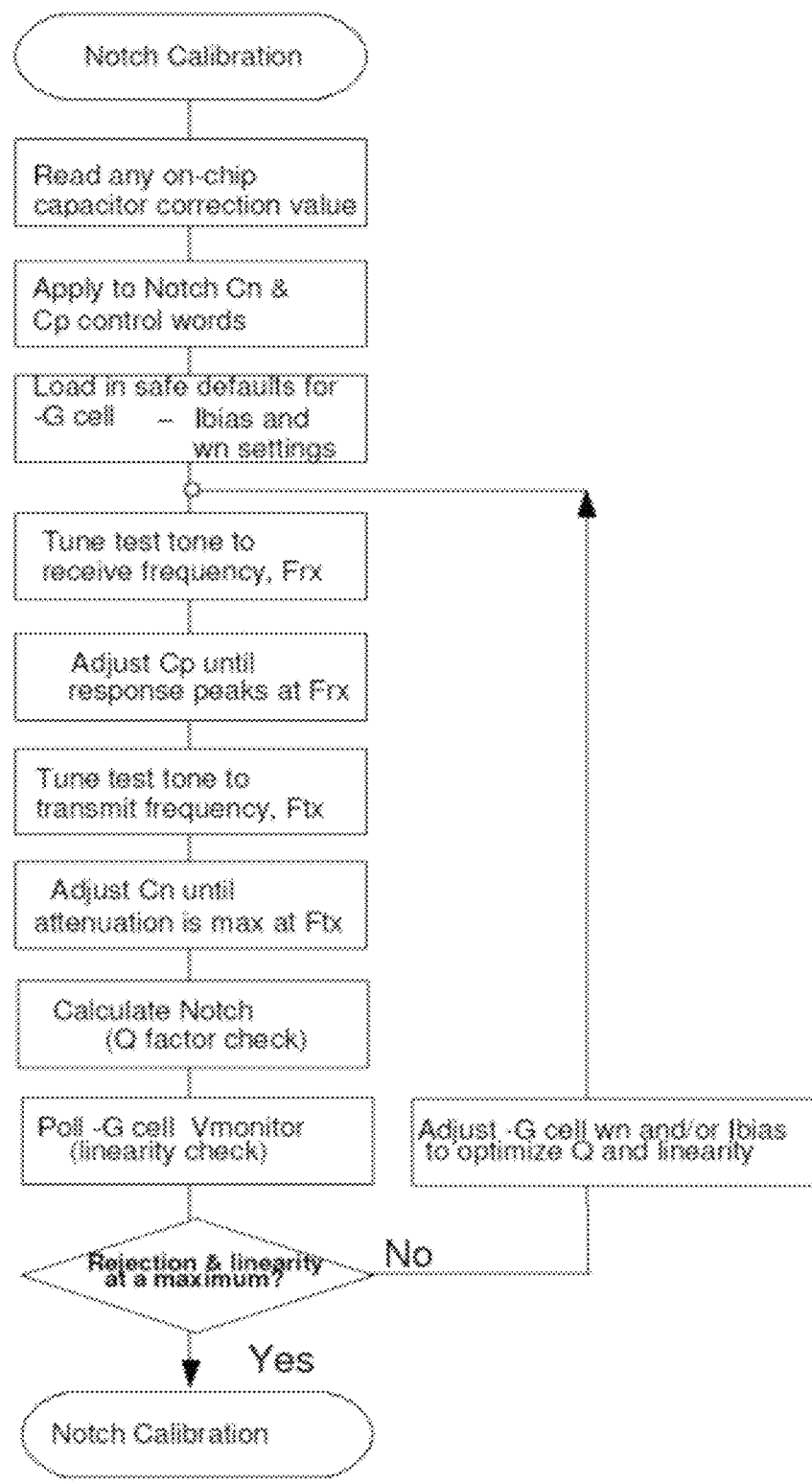
Figure 7: Calibration algorithm for notch filter

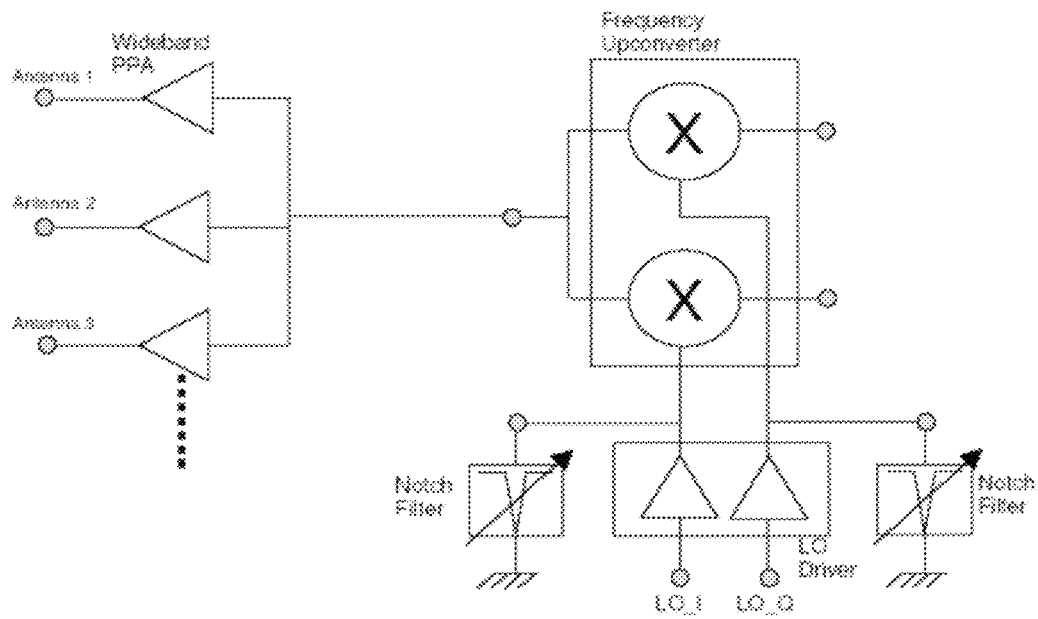
*Figure 9: Multi-band transmitter strip with notch filter in LO driver path*

REJECTION OF RF INTERFERERS AND NOISE IN A WIRELESS COMMUNICATIONS TRANSCEIVER

CROSS-REFERENCE TO RELAYED APPLICATIONS

This application is a continuation of International Application No. PCT/EP2011/052768, filed on Feb. 24, 2011, which claims priority to English Patent Application No. GB 1003183.9, filed on Feb. 24, 2010, both of which are hereby incorporated by reference in their entireties.

TECHNICAL FIELD OF THE INVENTION

The present invention relates generally to radio transceivers used for digital communication systems. More specifically, the invention relates to a system and method that provides adaptive, reconfigurable, rejection of RF interferers while avoiding the need for expensive, off-chip RF SAW filters. The invention incorporates techniques that allow for wide receiver dynamic range at lowest power consumption when implemented within the constraints of a low voltage CMOS process for example 40 nm.

BACKGROUND OF THE INVENTION

U.S. Patent Publication No. 2005/0107051 (A1) May 19, 2005, Aparin et al., "Adaptive Filter for transmit Leakage Signal Rejection"

U.S. Pat. No. 7,221,924 (B2) May 22, 2007, Zheng et al., "Wideband Monolithic Tunable High-Q Notch Filter for Image rejection in RF Application"

U.S. Pat. No. 266360 (B2) Sep. 4, 2007, Kang et al., "Low Noise Amplifier for Wireless Communications"

U.S. Patent Publication No. 2007/0264943 (A1) Nov. 15, 2007, Darabi H., "Translation and Filtering Techniques for Wireless Receivers"

ISSCC 2008 10.2 Feb. 2008, Tenbroek et al., "Single-Chip Tri-Band WCDMA/HSDPA Transceiver without External SAW Filters and with Integrated Tx Power Control"

IEEE TRANSACTIONS ON CIRCUITS AND SYSTEMS—II: EXPRESS BRIEFS, VOL. 55, NO. 3, March 2008, Groe J., "A Multimode Cellular Radio"

U.S. Patent Publication No. 2008/0242245 (A1) Oct. 2, 2008, Aparin V, "Rejection of Transmit Signal Leakage in Wireless Communication Device"

U.S. Pat. No. 7,471,204 (B2) Dec. 30, 2008, Aminghasem S et al., "Receiver Architecture for Canceling Blocking Signals"

JSSC 2009 Vol. 44, February 2009, Vallese et al., "Analysis and Design of an Integrated Notch Filter for the Rejection on Interference in UWB Systems"

U.S. Patent Publication No. 2009/0213764 (A1) Aug. 27, 2009, Chinq-Shiun et al., "Full Division Duplex System and a Leakage Cancellation Method"

U.S. Patent Publication No. 2009/0213770 (A1) Aug. 27, 2009, Fenghao Mu, "Active Cancellation of Transmitter Leakage in a Wireless Transceiver"

U.S. Patent Publication No. 2009/0233568 (A1) Sep. 17, 2009, Zhang et al., "High Linearity Receiver with Transmit Leakage Cancellation"

Advanced wireless communication systems for commercial applications such as WCDMA (Wideband Code Division Multiple Access) and LTE (Long Term Evolution) cellular have been designed to maximize the data capacity, range and immunity to interference for a given radio channel. Hence the transceivers used in the terminals for these systems have to deliver excellent performance while meeting the cost targets required for successful commercial adoption. The RF (Radio Frequency) receiver section has to deliver very low noise to allow a weak desired signal to be received while simultaneously having high linearity (power handling capability) and high rejection of unwanted signals to avoid distortion when the interferers are present as well as the desired signal. Contributing to the relatively high terminal cost is the low integration of current cellular radios. WCDMA and LTE are FDD (Frequency Division Duplex) systems meaning that both the transmitter and receiver are operating at the same time. This presents a particular problem in that the high powered transmit signal has the potential to distort the weak desired signal being received through the limited receiver linearity. The second point is that noise on the high powered transmit signal will appear in the desired receiver band. Both of these effects corrupt and can potentially make the desired signal unrecoverable.

A standalone electronic device known as a duplexer is used to isolate the receiver from the high power transmit signal but the isolation between transmitter and receiver that is provided by low area, low cost duplexers is limited, with a minimum isolation at the TX frequency of 50 dB. Taking the example of a Class-3 WCDMA terminal, the power delivered to the antenna in transmit mode is +24 dBm. Allowing for 2 dB insertion loss resulting from the duplexer and the switch, the power at the PA (Power Amplifier) output has to be +26 dBm. This means that the receiver will see a TX leakage at its input of up to −24 dBm while simultaneously receiving a desired signal at −98 dBm.

Today's WCDMA and LTE transceivers deal with the transmitter blocking problem by using an external transmit SAW filter to eliminate transmit noise in the desired receive band and an external LNA (Low Noise Amplifier) and receive SAW (Surface Acoustic Wave) filter to achieve sufficient receiver linearity. This means a tri-band transceiver with 2 port receiver diversity requires 9 SAW filters and 6 LNAs which is obviously contrary to the requirement for a highly integrated, low cost cellular terminal. Such a terminal requires a silicon integrated radio that has the ability to deal with the TX blocker and TX noise in the receive band without the need for external SAW filters, the so-called "SAW-less" radio.

The need to deliver commercial radios that are low cost and suitable for integration within a larger single IC known as an SoC (System-on-a-chip) in which radio, digital and other functions are combined means implementation in a deep sub-um CMOS process. The most advanced CMOS process node currently being used for near term commercial radio development is termed 40 nm, this refers to the minimum feature size on the mask that can be processed. The 40 nm node provides the opportunity of low cost digital logic and memory integration as well as high frequency core transistors but it also brings with it a low supply voltage limit and high parasitic routing resistance. Both of these features are significant limitations when it comes to delivering a low noise, high linearity radio.

SoCs for wireless applications designed in 40 nm technology allow for the cost effective integration of various applications e.g. cellular, GPS, Bluetooth, WiFi, FM etc. given the small digital logic and memory area resulting from scaling. However, the need to include a radio for each of these applications, integrated on the one silicon die brings up the problem of co-existence between the separate radios and between each radio and the digital baseband which in itself is an efficient generator of interference. A technique is required that will allow the separate radio receivers to operate successfully in this hostile environment i.e. to receive the desired air-borne signal with the required signal to noise and interference ratio while on-chip sources of interference are present e.g. 2 GHz digital logic clock, 2.48 GHz WiFi transmission.

As regards interference sources that have the potential to degrade radio receiver performance, these are not limited to those that are self-generated e.g. cellular Tx blocker or 2 GHz digital logic clock. Some of the most troublesome interferers are air-borne and these can be picked up by the antenna and delivered to the receiver in the same way as for a desired signal. GPS is an example of an application that is extremely sensitive to disruption from external interferers, legally and illegally generated. For example, the received satellite signal strength for GPS is typically −130 dBm. Commercial GPS receivers include a certain degree of processing gain as a result of the signal spreading technique used that gives the receiver some immunity to interference. The level of immunity varies between receiver types but is typically around 40 dB meaning that an external interferer in-band or close to band edge can prevent operation at a very modest power level of −90 dBm. A technique is required that will provide a high degree of on-chip (hence low cost) receiver selectivity at the RF frequency for the particular application, in this particular example 1.575 GHz for GPS. This scenario also applies to other radio receivers e.g. LTE.

In reality, any of the receiver functions may have to deal with more than one blocking signal simultaneously, for example the cellular receiver in FDD mode will need to tolerate its corresponding Tx blocker and possibly the 2 GHz digital logic clock.

SUMMARY OF THE INVENTION

Embodiments of the present invention relate to methods, systems and device that allow each receiver to deal with more than one source of interference. An advantage can be that separate radio receivers to operate successfully in a hostile interference environment.

Embodiments of the present invention provide an adaptable, reconfigurable, multi-band SAW-less radio receiver and/or transmitter that can operate within the limitations of 40 nm and similar low voltage CMOS technology nodes. It can incorporate one or more of the following distinctive, individual and independent elements:

1) A current output node from a single LNA or a number (depending on bands and modes catered for) of LNAs. In the latter case, the current output node sums all of the separate LNA outputs. This means current rather than voltage is processed as the signal moves beyond the LNA and further down the receive path.
2) A shunt style of steerable frequency notch filter for attenuating interferers added to the LNA current output node. This can result in low or minimum insertion loss and noise figure degradation for the complete receiver.
3) An adaptable negative conductance circuit that allows the amount of interference rejection provided by the notch filter to be varied with the bias current setting and RF device size setting.
4) An adaptable negative conductance circuit that allows parasitic resistance such as that encountered in a 40 nm or similar low voltage CMOS technology node to be compensated for. The level of compensation can be a function of the setting of bias current and RF device width. For example, the adaptable negative conductance circuit could be retrofitted to an LNA load inductor to give a Q (Quality) factor boost.
5) An overdrive monitor circuit that provides a signal which indicates the distribution of the available supply voltage between devices in the negative conductance circuit. This signal in turn can be applied to a local analog loop which adjusts the bias current and RF device width within the negative conductance circuit to maximize the linearity of the notch filter for a specific level of notch filter rejection. Alternatively, this control loop can be closed through the digital baseband.
6) A shunt style of steerable frequency notch filter placed prior to the PPA (pre-power amplifier) or PPAs in a cellular transmitter for rejecting transmitter noise occurring in the corresponding receiver band and/or spurious frequency components.
7) A steerable frequency notch filter placed prior to an LO (local oscillator) input to a frequency converter such as an upconverter (transmitter application) or frequency downconverter (receiver application) to attenuate out of band noise or spurious components.

Embodiments of the present invention allow separate radio receivers to operate successfully in a hostile interference environment i.e. to receive a desired air-borne signal with the required signal to noise and interference ratio while on-chip sources of interference are present e.g. 2 GHz digital logic clock, 2.48 GHz WiFi transmission.

Embodiments of the present invention provide a high degree of on-chip (hence low cost) receiver selectivity at the RF frequency for the particular application, for example 1.575 GHz for GPS. This also applies to other radio receivers e.g. LTE.

Embodiments of the present invention allow a receiver to deal with more than one source of interference.

Embodiments of the present invention can be implemented within the low supply voltage and relatively high interconnect parasitics constraints of a 40 nm CMOS (or similar) process.

Whereas a frequency translational loop can be used to implement rejection of an interferer in a "SAW-less" manner, embodiments of the present invention make use of a substantially different technique to the adaptive RF notch filter which does not rely on frequency translation. In particular a "shunt notch." can be used.

A frequency translational loop can be used as a notch filter rather than a low pass filter after downconversion within the loop (IF notch). Embodiments of the present invention provide a substantially different technique which does not rely on frequency translation.

When using a post LNA notch for cellular applications using an adaptive filter made up of a summer and a complex adaptive estimator, the adaptive estimator depends on receiving the transmitter output signal and a separate reference signal. Embodiments of the present invention provide a substantially different technique which is interferer agnostic in that it can reject the local Tx signal or an external blocker picked up by the antenna.

A notch filter for post downconversion is known, that may be called an IF (Intermediate Frequency) notch rather than an RF (Radio Frequency) notch which is implemented prior to downconversion. The difference is substantial in that the IF notch does not protect the downconverting block (mixer) whereas the RF notch does. In radio receivers this downconverter block can be responsible for limiting the receiver's linearity hence the importance of protecting it with an RF notch.

An on-chip SAW-less technique for image reject filtering applications where the fractional spacing between desired and rejected bands is high e.g. F_rejection=0.5*F_desired, is not applicable to cellular Tx rejection applications where typically F_rejection=0.96*Fdesired. Such an approach does not use Q enhancement hence it is limited to wide spacing of desired and interference signals.

Where an RF notch with Q enhancement is used, there are a number of substantial issues that should be born in mind:
1) A notch circuit which is single resonance based (LC), differs from embodiments of the present invention that use two resonances (LCC), a peak and a trough, to maximize the interferer rejection. It does this with just the one inductor which is important in that inductors require a large amount of silicon area meaning more cost.
2) Q enhancement circuits can be challenged for low voltage, 40 nm and below CMOS implementation, for instance if three layers of device stacking are used. Embodiments of the present invention can use only two layers of device stacking
3) Embodiments of the present invention can include an overdrive monitor circuit as part of the Q enhancement circuit that steers the circuit to maximum linearity under all conditions. This makes these embodiments suitable for 40 nm and below CMOS.
4) Embodiments of the present invention can have the option of implementing a second resonance to deal with a dual interference case.

As modern cellular standards develop, the performance requirements on the radio subsystem of a cellular communication increase. In particular the demands on the radio receiver have become particularly severe in terms of the extensive dynamic range and wide band coverage required while still having to work within a strict cost budget. An added factor in the challenge of designing a high performance cellular receiver is that the block is likely to be implemented as part of a CMOS SoC and operated at a low supply voltage, typically at or below 1.2V.

In embodiments of the present invention, the radio can avoid the need to have receive or transmit SAW filters or an external LNA. It can use an inductorless, wideband, current output LNA that is repeated for each separate band input required. One or a number of current output LNAs are followed by a shunt style of steerable frequency notch filter that filters out the transmit blocker and/or unwanted interferers. Preferably the filtering is to such a level where the interferers do not cause any significant distortion in the following receive blocks. The LNA+notch combination is preferably followed by a passive capacitive attenuator that allows the LNA to operate at high gain for minimum noise figure while ensuring the pre-mixer gain is at a level that avoids mixer linearity problems.

The receiver described has been extensively analysed in 40 nm for WCDMA and LTE cellular applications. For example, operating in the popular 960 MHz band the following performance parameters have been simulated

| Parameter | Value | Comment |
| --- | --- | --- |
| Gain | 21 dB | Maximum gain setting |
| Noise Figure | 1.4 dB | At maximum gain |
| IIP3 (linearity) | −4 dBm | At maximum gain |
| Notch Rejection | 15 dB | Maximum TX rejection setting |
| Power consumption | 24 mW | Maximum TX rejection setting |

Reducing the interference rejection down to 0 dB reduces power consumption from 24 mW to 14 mW.

All of the 12 pieces of prior art mentioned above fall into one of three categories
1) Translational loop (TL). The inbound receive signal is downconverted, filtered at low frequency where a large amount of selectivity can be applied and then upconverted back to RF. The upconverted signal is then combined with the original incoming Rx signal to cancel the interferer (usually but not necessarily a Tx blocker)
2) Tx Copy (TC). A copy of the transmit signal is applied to the receive strip where it is processed and applied to the inbound Rx signal in a way that cancels out the Tx blocker. Not applicable to general interferer cancellation, Tx blocker specific.
3) Notch Filter (NF). The inbound Rx signal is applied to a notch filter circuit at RF which may or may not use a Q factor enhancement technique to deliver the required selectivity.

U.S. Patent Publication No. 2005/0107051 (A1): TC, A post LNA notch is implemented for cellular applications using an adaptive filter made up of a summer and a complex adaptive estimator. The adaptive estimator depends on receiving the transmitter output signal and a separate reference signal. This is a significantly different technique to that proposed in this patent application and it is only applicable to Tx blocker rejection, not general interferer rejection as it relies on a local copy of the Tx signal to implement the notch filter.

U.S. Pat. No. 7,266,360 (B2): NF, On-chip SAW-less technique for image reject filtering applications where the fractional spacing between desired and rejected bands is high e.g. F_rejection=0.5*F_desired. This technique is not applicable to cellular Tx rejection applications where typically F_rejection=0.96*Fdesired. It is designed for improving the performance of super heterodyne receivers.

U.S. Pat. No. 7,221,924 (B2): NF, Similar to U.S. Pat. No. 7,266,360 (B2), on-chip SAW-less technique for image reject filtering applications NOT for cellular TX or general interferer rejection applications. Comments above apply.

U.S. Patent Publication No. 2007/0264943(A1): TL, Uses a frequency translational loop to implement rejection of an interferer. A totally different technique to the adaptive notch filter and one that suffers from significant drawbacks, the most important one being a severe degradation in NF (Noise Figure) of around 3 dB.

ISSCC 2008 10.2: NF, A similar technique to what is proposed in this patent for cellular applications, an adaptive notch filter with negative conductance for Q enhancement at the output of an LNA. However, this technique has been designed and implemented for a high voltage 0.18 um process whereas the proposed patent includes specific ideas that allow this type of system to operate successfully within the limitations of low voltage 40 nm technology and where there are multiple receiver inputs.

IEEE TRANS: NF, A post LNA, RF notch filter using a series topology and not requiring a negative conductance generator for Q enhancement. This notch filter technique suffers from high insertion loss and is not applicable to low voltage, current mode circuits.

U.S. Patent Publication No. 2008/0242245 (A1): TL, This is an interferer rejection technique based on the frequency translation approach and similar in concept to U.S. Patent Publication No. 2007/0264943 (A1) and as such is totally different from the approach proposed in this patent application.

U.S. Pat. No. 7,471,204 (B2): TC, This is a cancellation based technique applicable to Tx interferer blocking only in that it depends on the generation of a signal representative of the Tx blocker. This representative signal is then compared with the inbound signal and the resultant error signal used to maximize the cancellation of the incoming blocker signal. A totally different technique to the one proposed in this patent application.

JSSC 2009 Vol. 44 February 09: NF, This publication outlines a similar technique to what is proposed in this patent in that it is an LNA with a frequency steerable notch filter on its output. Key differences are that it has been designed for single receiver input, ultra wideband (UWB) applications, it has been implemented in 0.13 µm and does not contain the extra features detailed in this patent application to maximize performance in a low voltage process such as the 40 nm node.

U.S. Patent Publication No. 2009/0213764 (A1): TC, This is a cancellation based technique applicable to Tx interferer blocking only in that it depends on the generation of a signal representative of the Tx blocker. This representative signal is then compared with the inbound signal and the resultant error signal used to maximize the cancellation of the incoming blocker signal. A totally different technique to the one proposed in this patent application.

U.S. Patent Publication No. 2009/0213770 (A1): TC, This is a cancellation based technique applicable to Tx interferer blocking only in that it depends on the generation of a signal representative of the Tx blocker. This representative signal is then compared with the inbound signal and the resultant error signal used to maximize the cancellation of the incoming blocker signal. This is a poorer approach than the other cancellation techniques reviewed in that it will have severely degraded noise figure. A totally different technique to the one proposed in this patent application.

U.S. Patent Publication No. 2009/0233568 (A1): TL, A translational loop technique which is similar to U.S. Patent Publication No. 2008/0242245 (A1) except it uses a notch filter rather than a low pass filter after downconversion within the loop. It also calls out the options of placing the feedback either before or after the LNA. A totally different technique to the one proposed in this patent application.

BRIEF DESCRIPTION OF THE DRAWINGS

FIG. 1 shows an embodiment of the present invention along with the proceeding block in a typical receiver path which is the frequency downconverter also known as a mixer.

FIG. 2 shows an embodiment of the present invention that has single rather than multiple LNA inputs.

FIG. 3 illustrates an embodiment of the present invention being a shunt notch filter in single ended form.

FIG. 4 illustrates an embodiment of the present invention being a shunt notch filter in differential form.

FIG. 5 illustrates an embodiment of the present invention that allows for the establishment of two notches (low band and high band) hence catering for a dual interferer scenario e.g. Tx blocker and processor clock.

FIG. 6 illustrates an embodiment of present invention being a –G cell that can be used with any of the other embodiments of the present invention and that is based on an NMOS differential cell with cross-coupled capacitive feedback FIG. 7 shows a flowchart describing a calibration process associated with one particular embodiment of the present invention that can be used with any of the other embodiments of the present invention.

FIG. 8 shows an embodiment of the present invention along with other blocks in a typical transmitter path in a transmitter or transceiver which includes a frequency upconverter also known as a mixer and the PPA (pre power amplifier).

FIG. 9 shows an embodiment of the present invention along with other blocks in a typical transmitter strip which includes the frequency upconverter also known as a mixer, the PPA (pre power amplifier) and the LO (local oscillator) driver.

DETAILED DESCRIPTION OF THE DRAWINGS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

FIG. 1 shows an embodiment of the invention along with the proceeding block in a typical receiver path which is the frequency downconverter also known as a mixer. In this embodiment, one or a number of LNA blocks 104 105 106 are provided, each separate LNA corresponding to a separate receive antenna input 101 102 103 on the silicon IC. The wideband nature of each LNA means that specific RF bands can be flexibly applied to the receiver strip antenna inputs hence allowing the resultant product to deliver many different configurations. The LNA block design will have an optimum gain value that delivers the best mix of noise figure, linearity, gain and input impedance match.

The current output of each LNA 104 105 106 is desirable from a signal linearity point of view given the voltage supply limitations of deep submicron CMOS circuitry. Current outputs allow single output node summing of the LNAs and a specific LNA is enabled by simply powering it up. The current output also allows the use of a single shunt notch structure 107 which has the advantage of delivering adequate transmit blocker or interferer rejection with minimum insertion loss. For example, a series notch will suffer from significant insertion loss which in turn translates to higher receive noise figure, poorer linearity and higher power consumption. An input shunt notch would result in a significant noise figure degradation (3 dB can be expected) and would need to be replicated for each input. The shunt notch 107 can be conveniently placed on the single summing node at the LNA 104 105 106 outputs and is preferably electronically steerable to allow for the different blocker frequencies associated with the different bands. The shunt notch 107 also is preferably adjustable to maximize the extent to which it rejects a given blocker. Finally, the shunt notch 107 can be conveniently powered down when there is no troublesome transmit blocker or external interferer present at the LNA 104 105 106 inputs. This results in a reduction in power consumption of the receiver which is always welcome in a battery powered terminal application. It also removes any minor degradation in receiver noise figure that is present when the shunt notch filter is operational.

The attenuator 108 in this embodiment can use a series shunt capacitor arrangement and allows the receiver RF gain to be set at a value that matches the linearity requirements of the frequency downconverter 109 regardless of the optimum LNA gain level. This attenuator 108 can be variable in XdB steps where X is number driven by the overall receiver dynamic range requirements and AGC system.

An alternative embodiment of the invention has differential rather than single ended LNAs 104 105 106, notch 107 and attenuator 108. This provides extra immunity to on-chip generated sources of interference (e.g. digital clock harmonics) as well as increased linearity (typically 3 dB advantage).

FIG. 2 shows an embodiment of the invention that has single rather than multiple LNA inputs. Other components are as described for FIG. 1. This architecture is suitable to single band radio applications that are susceptible to interferers such as GPS.

FIG. 3 illustrates an embodiment of the shunt notch filter in single ended form. It has a dual resonance frequency response whereby the resonance of the parallel capacitance (Cp) with the inductor peaks the response at the higher frequency side while the resonance of the combination of the series capacitance (Cn) and parallel capacitance (Cp) with the inductor nulls the response creating a notch at the lower frequency side. A separate calibration circuit modifies the series and parallel capacitor values to align the frequency null at the unwanted blocker and the frequency peak at or close to the desired frequency. The difference between both peak and null in amplitude response is specified as the rejection or selectivity of the notch filter.

FIG. 4 illustrates an embodiment of the shunt notch filter in differential form. It has a dual resonance frequency response whereby the resonance of the parallel capacitance (Cp) with the inductor peaks the response at the higher frequency side while the resonance of the combination of the series capacitance (Cn) and parallel capacitance (Cp) with the inductor nulls the response creating a notch at the lower frequency side. A separate calibration circuit modifies the series and parallel capacitor values to align the frequency null at the unwanted blocker and the frequency peak at or close to the desired frequency. The difference between both peak and null in amplitude response is specified as the rejection or selectivity of the notch filter.

The shunt notch filter in differential form shown in FIG. 4 is applicable to a differential LNA output and can have the same frequency response as the single ended version.

An alternative embodiment of the notch filter that includes an extra inductor is shown in FIG. 5. This arrangement allows for the establishment of two notches (low band and high band) hence catering for a dual interferer scenario e.g. Tx blocker and processor clock. It also peaks the response at the low side of the high band notch instead of the high side which is suitable for certain cellular receive and transmitter applications.

The –G (negative conductance) cell employed within the notch filter and that can be used with any of the embodiments of the present invention is sometimes called a Q-enhancement circuit and maximizes Q factor and hence notch rejection. This circuit typically provides bias current and RF device size increments that are adjusted under control of a calibration routine (provided by a calibration circuit) to optimize the level of negative conductance generated as well as the associated circuit linearity.

FIG. 6 illustrates one possible embodiment of the –G cell that can be used with any of the other embodiments of the present invention and that is based on an NMOS differential cell with cross-coupled capacitive feedback. The level of negative conductance generated is altered by adjusting the bias current (Ibias) and/or the RF NMOS device width (wn). The mix of Ibias and wn used to establish the required amount of negative conductance is chosen by a local control loop or the digital baseband to give a level of linearity performance that does not degrade the overall receiver linearity.

FIG. 7 shows a flowchart describing the calibration process associated with one particular embodiment of the invention that can be used with any of the other embodiments of the present invention. It applies to both the single ended and the dual ended embodiments. This process is typically controlled by the microprocessor in the system but could also be done by an external controller. On starting the notch calibration, the first step is to read the capacitor correction value or values generated by an initial calibration for manufacturing process errors and to apply this to the Cn and Cp control words corresponding to the desired channel of operation. This will have the affect of setting Cp and Cn values to approximately the correct values. Next values for the bias current (Ibias) and RF device width (wn) need to be applied that are "safe" i.e. unlikely to cause instability for the desired channel. Apply a test or calibration tone to the LNA input at the desired receive channel frequency. This tone will typically be generated on-chip to allow for a self-contained calibration procedure. Adjust the Cp until the notch response begins to peak in amplitude. Retune the test tone to the corresponding transmit frequency and adjust Cn until the notch attenuation is at a maximum. Calculate the resultant notch rejection and poll the Vmonitor signal to determine if the voltage bias in the negative G cell is optimum for circuit linearity. If both rejection and Vmonitor are at the specified values then the calibration is complete. However, it is expected that for a first calibration on a particular channel this process will have to be repeated a number of times to complete the calibration successfully.

The calibration method can also be applied in a transmitter or transceiver as shown for example in FIG. 8 or 9. It applies to both the single ended and the dual ended embodiments. This process is typically controlled by the microprocessor in the system but could also be done by an external controller. On starting the notch calibration, the first step is to read the capacitor correction value or values generated by an initial calibration for manufacturing process errors and to apply this to the Cn and Cp control words corresponding to the desired channel of operation. This will have the affect of setting Cp and Cn values to approximately the correct values. Next values for the bias current (Ibias) and RF device width (wn) need to be applied that are "safe" i.e. unlikely to cause instability for the desired channel. Apply a test or calibration tone to the upconverter at the desired transmit channel frequency. This tone will typically be generated on-chip to allow for a self-contained calibration procedure. Adjust the Cp until the notch response begins to peak in amplitude. Retune the test tone to the corresponding receive frequency and adjust Cn until the notch attenuation is at a maximum. Calculate the resultant notch rejection and poll the Vmonitor signal to determine if the voltage bias in the negative G cell is optimum for circuit linearity. If both rejection and Vmonitor are at the specified values then the calibration is complete. However, it is expected that for a first calibration on a particular channel this process will have to be repeated a number of times to complete the calibration successfully.

FIG. 8 shows an embodiment of the invention along with other blocks in a typical transmitter path in a transmitter or transceiver which includes a frequency upconverter also known as a mixer and the PPA (pre power amplifier). In this embodiment, there are a number of PPA blocks, for example one or more. The present invention can be applied to both the single ended and the dual ended schemes. Each separate PPA corresponding to a separate antenna output on the silicon IC. The shunt notch filter that is the type described for any of the embodiments of the present invention can be conveniently placed on the single summing node at the PPA inputs and is electronically steerable to allow for rejection of the transmitter noise in the various corresponding receive bands. The shunt notch filter also is adjustable to maximize the extent to which it rejects the transmitter noise.

The shunt notch filter in a transmit path has all the advantages and characteristics and components as described for a receiver FIG. 9 shows an embodiment of the invention along with other blocks in a typical transmitter strip which includes the frequency upconverter also known as a mixer, the PPA (pre power amplifier) and the LO (local oscillator) driver. In this embodiment, the shunt notch filter that can be the type of any of the embodiments of the present invention can be placed prior to the LO port of the frequency upconverter to allow for rejection of the transmitter noise in the various corresponding receive bands. The shunt notch filter also is adjustable to maximize the extent to which it rejects the transmitter noise.

In any transmitter or transceiver embodiment of the present invention, the shunt notch filter can have a series capacitance and a series inductance that give a frequency null in the current transfer function, the capacitance in the notch filter being tunable to allow the null to be steered to the transmit noise.

Optionally, the shunt notch filter in any transmitter or transceiver embodiment of the present invention can have a series capacitance and shunt inductance and capacitance that give both a frequency null and frequency peak in the current transfer function, both series capacitance and shunt capacitance in the notch filter being tunable to allow the null to be steered to the transmit noise.

Optionally, the shunt notch filter in any transmitter or transceiver embodiment of the present invention can have a series capacitance and series inductance and shunt capacitance and inductance approach that gives both two separate frequency nulls and a frequency peak in the current transfer function, both series capacitance and shunt capacitance in the notch filter being tunable to allow the nulls and peak to be steered to the transmit noise and the desired signal, respectively.

In any transmitter or transceiver embodiment of the present invention, the shunt notch filter preferably has a negative conductance cell to provide Q factor enhancement to filter components such as inductors and/or capacitors in the shunt notch filter. The negative conductance cell can include a variable bias current and/or variable device size negative conductance generating transistors. The variable bias current can include switchable devices in a current source circuit.

The variable device size negative conductance generating transistors can include separately switched RF devices.

The negative conductance cell can have transistors and can include a circuit that determines the voltage distribution across the transistors and outputs a DC signal corresponding to this.

In an embodiment of the present invention the notch of said notch filter for a transmit path is set to correct null and peak frequencies via a calibration algorithm that runs in a digital state machine or in a microprocessor. Optionally the notch filter can be adapted to be powered down when there is no unwanted transmit noise present. For example, notch filter can be adapted to be operatable at a lower supply current when the unwanted transmit noise does not require maximum rejection thereby saving power consumption. Also optionally, the notch filter can be adapted to provide transmit noise rejection while also being adapted to ensure it does not degrade the overall transmitter linearity.

What is claimed is:

1. A radio transmitter comprising:
a power amplifier; and
a filter preceding the power amplifier and configured for attenuation of a transmit noise in a corresponding receiving band connected to a summed input node of the power amplifier,
wherein the filter configured for attenuation of the transmit noise in the corresponding receiver band is a tunable shunt notch filter, and
wherein the tunable shunt notch filter has a series capacitance, a shunt inductance and a shunt capacitance that give both a frequency null and a frequency peak in a current transfer function, both the series capacitance and the shunt capacitance in the notch filter being tunable to allow the frequency null and the frequency peak to be steered.

2. The radio transmitter of claim 1, wherein the tunable shunt notch filter has a series inductance that give a frequency null in the current transfer function.

3. The radio transmitter of claim 1 wherein the tunable shunt notch filter has a negative conductance cell to provide Q factor enhancement to filter components.

4. The radio transmitter of claim 3 wherein the negative conductance cell includes at least one of a variable bias current and variable device size negative conductance generating transistor.

5. The radio transmitter of claim 4 wherein the variable bias current includes switchable devices in a current source circuit.

6. The radio transmitter of claim 4 wherein the variable device size negative conductance generating transistors include separately switched Radio Frequency (RF) devices.

7. The radio transmitter of claim 3 wherein the negative conductance cell has transistors and includes a circuit that determines voltage distribution across the transistors and outputs a direct current (DC) signal corresponding to the voltage distribution.

8. The radio transmitter of claim 1, wherein the notch of the tunable notch filter is set to a correct null and peak frequencies via a calibration algorithm that runs in a digital state machine or in a microprocessor.

9. The radio transmitter of claim 1, wherein the tunable notch filter is adapted to be powered down when there is no requirement to attenuate transmit noise or spurious frequency components.

10. The radio transmitter of claim 1, wherein the tunable notch filter is adapted to be operable at a lower supply current when the unwanted transmit noise does not require maximum rejection so as to save power consumption.

11. The radio transmitter of claim 1, wherein the tunable notch filter is adapted to provide a transmit noise rejection that does not degrade the overall transmitter linearity.

12. A radio transmitter comprising:
a power amplifier; and
a filter preceding the power amplifier and configured for attenuation of a transmit noise in a corresponding receiving band connected to a summed input node of the power amplifier,
wherein the filter configured for attenuation of the transmit noise in the corresponding receiver band is a tunable shunt notch filter, and
wherein the tunable shunt notch filter has a series capacitance, a series inductance, a shunt capacitance and a shunt inductance approach that gives both two separate frequency nulls and a frequency peak in a current transfer function, both the series capacitance and the shunt capacitance in the notch filter being tunable to allow the two separate frequency nulls and the frequency peak to be steered.

13. The radio transmitter of claim 12 wherein the tunable shunt notch filter has a negative conductance cell to provide Q factor enhancement to filter components.

14. The radio transmitter of claim 13 wherein the negative conductance cell includes at least one of a variable bias current and variable device size negative conductance generating transistor.

15. The radio transmitter of claim 14 wherein the variable bias current includes switchable devices in a current source circuit.

16. The radio transmitter of claim 14 wherein the variable device size negative conductance generating transistors include separately switched Radio Frequency (RF) devices.

17. The radio transmitter of claim 14 wherein the negative conductance cell has transistors and includes a circuit that determines voltage distribution across the transistors and outputs a direct current (DC) signal corresponding to the voltage distribution.

18. The radio transmitter of claim 12, wherein the notch of the tunable notch filter is set to a correct null and peak frequencies via a calibration algorithm that runs in a digital state machine or in a microprocessor.

19. The radio transmitter of claim 12, wherein the tunable notch filter is adapted to be powered down when there is no requirement to attenuate transmit noise or spurious frequency components.

20. The radio transmitter of claim 12, wherein the tunable notch filter is adapted to be operable at a lower supply current when the unwanted transmit noise does not require maximum rejection so as to save power consumption.

21. The radio transmitter of claim 12, wherein the tunable notch filter is adapted to provide a transmit noise rejection that does not degrade the overall transmitter linearity.

* * * * *